(12) United States Patent
Takizawa

(10) Patent No.: US 8,860,276 B2
(45) Date of Patent: Oct. 14, 2014

(54) ELECTROMAGNETIC STEEL SHEET FORMED BODY, ROTOR CORE, ROTOR, ROTATING ELECTRICAL MACHINE, AND VEHICLE

(75) Inventor: Daijiro Takizawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 13/638,346

(22) PCT Filed: Mar. 15, 2011

(86) PCT No.: PCT/JP2011/056027
§ 371 (c)(1),
(2), (4) Date: Sep. 28, 2012

(87) PCT Pub. No.: WO2011/122328
PCT Pub. Date: Oct. 6, 2011

(65) Prior Publication Data
US 2013/0020897 A1 Jan. 24, 2013

(30) Foreign Application Priority Data
Mar. 30, 2010 (JP) .................................. 2010-079448

(51) Int. Cl.
*H02K 1/27* (2006.01)

(52) U.S. Cl.
CPC ...................................... *H02K 1/276* (2013.01)
USPC ............ 310/156.57; 310/156.47; 310/156.53; 310/156.56

(58) Field of Classification Search
USPC ............. 310/156.01, 156.47, 156.53, 156.56, 310/156.57
See application file for complete search history.

(56) References Cited

U.S. PATENT DOCUMENTS 7,851,958 B2 * 12/2010 Cai et al. ................... 310/156.53
8,227,953 B2 * 7/2012 Suzuki et al. ............ 310/156.53

FOREIGN PATENT DOCUMENTS

| CN | 101272066 A | 9/2008 |
| JP | 60-234448 A | 11/1985 |

(Continued)

OTHER PUBLICATIONS

Chinese Office Action dated May 16, 2014, issued in Chinese Patent Application No. 201180014743.9 with partial English translation (13 pages).

*Primary Examiner* — Dang Le
(74) *Attorney, Agent, or Firm* — Westerman, Hattori, Daniels & Adrian, LLP

(57) ABSTRACT

An electromagnetic steel sheet formed body to be used in a rotor core in which a forward rotational direction and a reverse rotational direction are assigned to a clockwise direction along a circumferential direction around an axial center when viewed from a visual line including the axial center, wherein a first hollow portion, a second hollow portion, and a rib partitioning the first hollow portion and the second hollow portion is formed at the electromagnetic steel sheet formed body such that permanent magnets constituting a plurality of poles are arranged substantially at regular intervals at predetermined pole pitch angles along the circumferential direction, and that the permanent magnet disposed at one pole is arranged in a segmented manner as the first permanent magnet and the second permanent magnet, when viewed from the visual line, and wherein the first hollow portion when viewed from the visual line is located closer to a side of the forward rotational direction than a centerline passing through a center angle of the pole pitch angle, and is arranged such that a longitudinal axis of the first hollow portion obliquely intersects in the clockwise direction with respect to a line perpendicular to the centerline.

12 Claims, 4 Drawing Sheets

(56) References Cited

FOREIGN PATENT DOCUMENTS

| | | |
|---|---|---|
| JP | 8-33246 A | 2/1996 |
| JP | 2002-136008 A | 5/2002 |
| JP | 2003-319584 | 11/2003 |
| JP | 3774808 B2 | 3/2006 |
| JP | 2008-86130 A | 4/2008 |
| JP | 2008-131813 A | 6/2008 |

* cited by examiner

US 8,860,276 B2

ELECTROMAGNETIC STEEL SHEET FORMED BODY, ROTOR CORE, ROTOR, ROTATING ELECTRICAL MACHINE, AND VEHICLE

CROSS-REFERENCED TO RELATED APPLICATION

This application is a National Stage entry of International Application PCT/JP2011/056027, filed Mar. 15, 2011, which claims priority to Japanese Patent Application No. 2010-079448 filed Mar. 30, 2010, the disclosure of the prior applications are hereby incorporated in their entirety by reference.

TECHNICAL FIELD OF THE INVENTION

The present invention relates to an electromagnetic steel sheet formed body, a rotor core, a rotor, a rotating electrical machine, and a vehicle.

Priority is claimed on Japanese Patent Application No. 2010-079448, filed Mar. 30, 2010, the content of which is incorporated herein by reference.

BACKGROUND ART

In recent years, vehicles equipped with electric motors (motors) for driving vehicles, such as fuel cell electric cars, hybrid cars and electric cars, have been successively developed. As the electric motors, those including a stator that has a coil disposed thereon, and a rotor that is rotatably supported around an axis on the inner peripheral side of the stator, and has permanent magnets disposed therein are general. As a structure in which the permanent magnets are disposed in the rotor, there is known an IPM (Interior Permanent Magnet) structure in which the permanent magnets are embedded in the rotor by inserting the permanent magnets into insertion holes provided in the rotor core.

For example, Patent Document 1 discloses a permanent magnet type rotor in which conductors and permanent magnets are arranged at a rotor iron core (corresponding to the rotor core of the present application), and the rotor in which the magnetic force of the permanent magnets are increased compared with the related art by placing the permanent magnets adjacent to each other at regular intervals in the circumferential direction and arranging the permanent magnets obliquely with respect to the radial direction of the rotor iron core.

Additionally, Patent Document 2 discloses an embedded magnet type motor in which permanent magnets are embedded in a rotor core, and the rotor core which has a two-piece structure of an inner rotor and an outer rotor, and in which permanent magnets are sandwiched at facing portions of the inner rotor and the outer rotor in a state where the magnets are inclined with respect to the circumferential direction of the rotor core.

PRIOR ART DOCUMENTS

Patent Documents

Patent Document 1: Japanese Unexamined Patent Application, First Publication No. S60-234448
Patent Document 2: Japanese Patent No. 3774808

SUMMARY OF THE INVENTION

Problems to be Solved by the Invention

Incidentally, an air gap is formed in a magnetic path of q-axis magnetic flux in Patent Document 1 and Patent Document 2. Since this increases the magnetic resistance of the q-axis magnetic flux, a reluctance torque becomes low. Accordingly, there is a problem in that a motor torque that is a resultant torque of the reluctance torque and a magnet torque becomes low.

Thus, an object of the invention is to provide an electromagnetic steel sheet formed body, a rotor core, and a rotor that can utilize a reluctance torque, and can improve a resultant torque of the reluctance torque and a magnet torque.

Additionally, another object of the invention is to provide an efficient rotating electrical machine and a vehicle using the same that can obtain a large torque at start-up or during abrupt load fluctuation, by including the electromagnetic steel sheet formed body, the rotor core, and the rotor.

Means for Solving the Problems

In order to solve the above problems, the aspects of the invention adopt the following measures.

[1] An electromagnetic steel sheet formed body related to a first aspect of the invention is an electromagnetic steel sheet formed body to be used in a rotor core in which a forward rotational direction and a reverse rotational direction are assigned to a clockwise direction along a circumferential direction around an axial center when viewed from a visual line including the axial center, wherein a first hollow portion having a first permanent magnet inserted thereinto, a second hollow portion having a second permanent magnet inserted thereinto, and a rib partitioning the first hollow portion and the second hollow portion is formed at the electromagnetic steel sheet formed body such that permanent magnets constituting a plurality of poles are arranged substantially at regular intervals at predetermined pole pitch angles along the circumferential direction, and that the permanent magnet disposed at one pole is arranged in a segmented manner as the first permanent magnet and the second permanent magnet, when viewed from the visual line, and wherein the first hollow portion when viewed from the visual line is located closer to a side of the forward rotational direction than a centerline passing through a center angle of the pole pitch angle, and is arranged such that a longitudinal axis of the first hollow portion obliquely intersects in the clockwise direction with respect to a line perpendicular to the centerline.

[2] In the electromagnetic steel sheet formed body according to the above [1], the second hollow portion when viewed from the visual line may be located closer to a side of the reverse rotational direction than the centerline, and may be arranged such that a longitudinal axis of the second hollow portion obliquely intersects in the clockwise direction with respect to the line perpendicular to the centerline.

[3] In the electromagnetic steel sheet formed body according to the above [2], the longitudinal axis of the first hollow portion and the longitudinal axis of the second hollow portion may be substantially parallel when viewed from the visual line.

[4] The electromagnetic steel sheet formed body according to the above [1] may further include a substantially rectangular first insertion hole provided at the first hollow portion and having the first permanent magnet inserted thereinto; and a substantially rectangular second insertion hole provided at the second hollow portion and having the second permanent magnet inserted thereinto; wherein space portion may be formed at a corner portion of the first insertion hole and at a corner portion of the second insertion hole, when viewed from the visual line.

[5] In the electromagnetic steel sheet formed body according to the above [2], the first insertion hole and the second insertion hole may be formed such that an outer peripheral side corner portion of the first permanent magnet on the side of the forward rotational direction and an outer peripheral side corner portion of the second permanent magnet on the side of the reverse rotational direction are arranged on a same circumference around the axial center, when viewed from the visual line.

[6] The electromagnetic steel sheet formed body according to the above [2] may further include a first flux barrier provided at the side of the forward rotational direction of the first hollow portion to prevent leakage of a magnetic flux of the first permanent magnet; and a second flux barrier provided at the side of the reverse rotational direction of the second hollow portion to prevent leakage of a magnetic flux of the second permanent magnet.

[7] In the electromagnetic steel sheet formed body according to Claim 6, the second flux barrier may have a larger area than the first flux barrier.

[8] In the electromagnetic steel sheet formed body according to the above [6], a peripheral edge portion of the first flux barrier and a peripheral edge portion of the second flux barrier may be curved, and a curvature radius of the each peripheral edge portions on a side of an external diameter may be larger than a curvature radius of the each peripheral edge portions on a side of an internal diameter.

[9] A rotor core related to one aspect of the invention is a rotor core formed by laminating a plurality of the electromagnetic steel sheet formed bodies according to any one of the above [1] to [8]. Each of the electromagnetic steel sheet formed bodies have been subjected to an insulation treatment.

[10] A rotor related to one aspect of the invention includes the rotor core according to the above [9]; and the first permanent magnet inserted into the first hollow portions of the rotor core and the second permanent magnet inserted into the second hollow portions.

[11] A rotating electrical machine related to one aspect of the invention is a rotating electrical machine including the rotor according to the above [10]; and a substantially annular stator arranged so as to cover an outer peripheral surface of the rotor.

[12] A vehicle related to one aspect of the invention uses the rotating electrical machine according to the above [11] as a rotating electrical machine for driving.

Effect of the Invention

According to the electromagnetic steel sheet formed body related to the aspect of the above [1], if the first permanent magnet is inserted into the first hollow portion, the longitudinal axis of the first permanent magnet is arranged so as to obliquely intersect in the clockwise direction with respect to the line perpendicular to the centerline when viewed from the visual line including the axial center. Thereby, the d-axis magnetic flux, which is generated from the first permanent magnet inserted into the first hollow portion, distributes in a biased distribution to the forward rotational direction with respect to the centerline. Accordingly, the phase at the peak of the magnet torque of the first permanent magnet approaches the phase at the peak of the reluctance torque. For this reason, a resultant torque of the reluctance torque and the magnet torque can be further improved compared with a resultant torque in a case where the d-axis magnetic flux is distributed along the centerline between poles. This enables a large resultant torque to be obtained at start-up or during abrupt load fluctuation. From the above, an efficient motor and a vehicle using the same can be provided.

Additionally, according to the electromagnetic steel sheet formed body related to the aspect of the above [2], if the second permanent magnet is inserted into the second hollow portion, the longitudinal axis of the second permanent magnet is arranged so as to obliquely intersect in the clockwise direction with respect to the line perpendicular to the centerline when viewed from the visual line including the axial center. For this reason, the permanent magnets are inserted into the first hollow portion and the second hollow portion, whereby the d-axis magnetic flux generated from the second permanent magnet inserted into the second hollow portion distributes in a biased distribution to the forward rotational direction side with respect to the centerline. Hence, as compared to an electromagnetic steel sheet formed body arranged such that only the longitudinal axis of the first hollow portion intersects with respect to the line perpendicular to the centerline, more d-axis magnetic flux distributes in a biased distribution to the forward rotational direction side from the centerline. Thereby, the phase at the peak of the magnet torque of the second permanent magnet approaches the phase at the peak of the reluctance torque, and the resultant torque of the reluctance torque and the magnet torque can be improved.

Additionally, according to the electromagnetic steel sheet formed body related to the above [3], as compared to a case where the longitudinal direction axis of the second hollow portion is not substantially parallel to the longitudinal axis of the first hollow portion, more d-axis magnetic flux distributes in a biased distribution to the forward rotational direction side from the centerline. Accordingly, if a rotor core formed by the electromagnetic steel sheet formed bodies rotates to the forward rotational direction side, the reluctance torque can be more effectively used. For this reason, the resultant torque of the reluctance torque and the magnet torque can be further improved. Hence, a large torque can also be obtained at the start-up of the rotor core or during abrupt load fluctuation thereof, and an efficient motor and a vehicle using the same can be provided.

Additionally, according to the electromagnetic steel sheet formed body related to the above [4], when the first permanent magnet and the second permanent magnet are inserted, the corners of the first permanent magnets and the second permanent magnet can be prevented from interfering with the corner portions of the insertion holes. This can prevent the permanent magnets or the electromagnetic steel sheet formed body from being damaged due to the stress resulting from the centrifugal force of the rotor core when the rotor core rotates.

Additionally, according to the electromagnetic steel sheet formed body related to the above [5], the outer peripheral side corner portion of the first permanent magnet on the forward rotational direction side and the outer peripheral side corner portion of the second permanent magnet on the reverse rotational direction side are located at the outermost peripheral side of the electromagnetic steel sheet formed body when viewed from the visual line. Thereby, if a rotor core formed by the electromagnetic steel sheet formed bodies rotates to the forward rotational direction side, short-circuiting magnetic paths of the d-axis magnetic flux on the forward rotational direction side of the first insertion hole and on the reverse rotational direction side of the second insertion hole can be narrowed. This can minimize d-axis magnetic flux leakage, and can efficiently convert a magnetic force into a rotative force.

Additionally, according to the electromagnetic steel sheet formed body related to the above [6], leakage of the magnetic flux of the first permanent magnet and the second permanent magnet can be prevented. For this reason, the short-circuiting magnetic paths of the d-axis magnetic flux can be narrowed.

Additionally, according to the electromagnetic steel sheet formed body related to the above [7], the second flux barrier has a larger area than the first flux barrier. Therefore, an effective area obtained by subtracting the area of the first flux barrier from the area of the electromagnetic steel sheet formed body on the forward rotational direction side of the first hollow portion, and an effective area obtained by subtracting the area of the second flux barrier from the area of the electromagnetic steel sheet formed body on the reverse rotational direction side of the second hollow portion substantially coincide with each other. Accordingly, balance in weight between the forward rotational direction side and the reverse rotational direction side of the electromagnetic steel sheet formed body across the centerline can be achieved. For this reason, the dynamic balance when the electromagnetic steel sheet formed body rotates can be secured, and the rotor core with little torque pulsation can be provided.

Additionally, according to the electromagnetic steel sheet formed body related to the above [8], the electromagnetic steel sheet formed body is rotated in a state where the permanent magnets are arranged at the electromagnetic steel sheet formed body. Thereby, even if a centrifugal force acts on the permanent magnets, the stresses to the first hollow portion and the second hollow portion can be distributed at the peripheral edge portions that are curved. Additionally, since the curvature radius of the external diameter side peripheral edge portion is larger than the curvature radius of the internal diameter side peripheral edge portion, particularly the stress to the external diameter side peripheral edge portion on which the centrifugal force tends to act can be effectively distributed. This can suppress the concentration of the stresses to the peripheral edge portions of the first flux barrier and the second flux barrier. From the above, damage to the permanent magnets or the electromagnetic steel sheet formed body can be prevented.

Additionally, according to the rotor core related to the above [9], the electromagnetic steel sheet formed bodies are subjected to insulation treatment, so that a passage for an eddy current of the rotor core can be narrowed. For this reason, the flow of an eddy current can be suppressed and the magnetic force of the permanent magnets can be efficiently converted into a rotative force.

Additionally, according to the rotor related to the above [10], the above-described rotor core is included. Therefore, the rotor is rotated to the forward rotational direction, so that a resultant torque of the reluctance torque and the magnet torque can be further improved compared with a resultant torque in a case where the d-axis magnetic flux is distributed along the centerline.

Additionally, according to the rotating electrical machine related to the above [11] and the vehicle related to the above [12], the above-described rotor is included. Therefore, the rotor is rotated to the forward rotational direction, so that a resultant torque of the reluctance torque and the magnet torque can be further improved compared with a resultant torque in a case where the d-axis magnetic flux is distributed along the centerline. Thereby, a large torque can also be obtained at the start-up of the rotor core or during abrupt load fluctuation thereof, and an efficient rotating electrical machine and a vehicle using the same can be provided.

DESCRIPTION OF EMBODIMENTS

A rotating electrical machine (hereinafter referred to as a "motor") related to one embodiment of the invention will be described with reference to the drawings. In addition, in the present embodiment, description will be made using a motor loaded on a vehicle.

Figure 1:
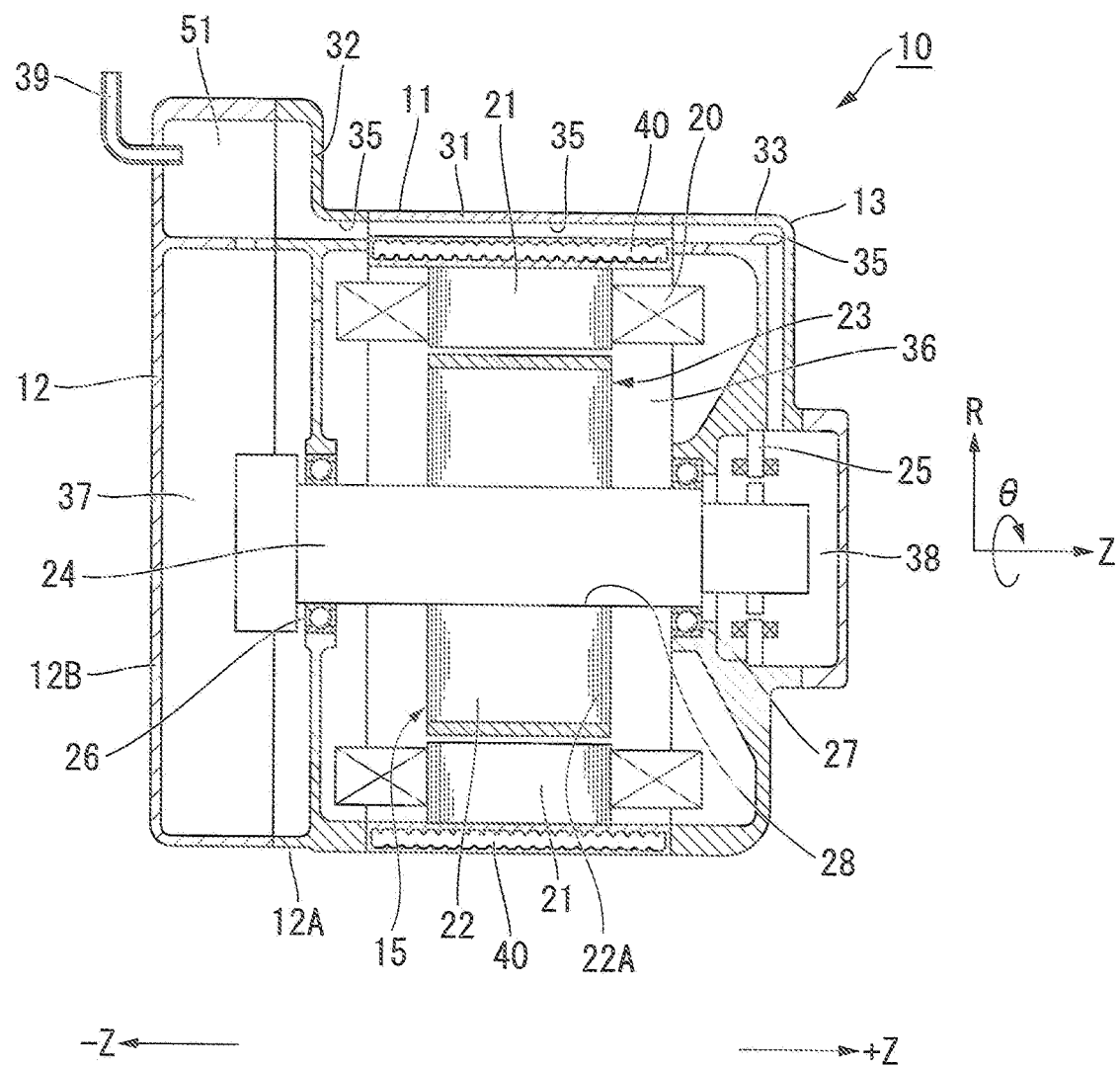
FIG. 1 is a cross-sectional view of a schematic configuration of a powertrain for a vehicle related to one embodiment of the invention.

FIG. 1 is a cross-sectional view of a schematic configuration of a powertrain for a vehicle. In addition, in the following description, the circumferential direction of a rotor 15 (hereinafter referred to as a rotor 15) is defined as a θ direction, the forward rotational direction side of the rotor 15 is defined as a +θ, and the reverse rotational direction side of the rotor 15 is defined as a −θ. Additionally, the radial direction of the rotor 15 is defined as an R direction, the outer peripheral side of the rotor 15 is defined as a +R, and the center side of the rotor 15 is defined as a −R. Moreover, the axial direction of the rotor 15 is defined as a Z direction, a sensor housing 13 side is defined as a +Z, and a transmission housing 12 side is defined as a −Z. Hereinafter, description will be made using the cylindrical coordinate system of θ, R, and Z if needed.

As shown in FIG. 1, a powertrain 10 for a vehicle (hereinafter referred to as a powertrain) includes a motor housing 11, a transmission housing 12 fastened to one side (−Z side) of the motor housing 11, and a sensor housing 13 fastened to the other side (+Z side) of the motor housing 11.

Additionally, a motor chamber 36 is configured inside the motor housing 11. A motor 23 including a stator 21 and the rotor 15 is accommodated in the motor chamber 36.

The transmission housing 12 is constituted by a common housing 12A fastened to the motor housing 11, and a gear housing 12B fastened to the common housing 12A. A transmission chamber 37 is configured inside the transmission housing 12. A power transmission part (not shown) that transmits power from an output shaft 24 of the motor 23 is accommodated in the transmission chamber 37.

A sensor chamber 38 is configured inside the sensor housing 13. A rotation sensor 25 of the motor 23 is accommodated in the sensor chamber 38.

The motor housing 11 is formed in a substantially cylindrical shape that covers the whole motor 23. A bearing 26 that rotatably supports one end of the output shaft 24 of the motor 23 is provided on the transmission housing 12 side of a boundary portion between the motor housing 11 and the transmission housing 12. A bearing 27 that rotatably supports the other end of the output shaft 24 of the motor 23 is provided on the sensor housing 13 side of a boundary portion between the motor housing 11 and the sensor housing 13.

Breather passages 35 that communicate with each other are formed in a wall portion 31 of the motor housing 11, a wall portion 32 of the transmission housing 12, and a wall portion 33 of the sensor housing 13.

Moreover, a water jacket 40 for cooling the motor 23 is provided closer to the inner peripheral side than the breather passage 35 within the wall portion 31 of the motor housing 11 so as to cover the whole circumference of the stator 21 of the motor 23. Additionally, the stator 21 is shrink-fitted into the motor housing 11, and is arranged so as to come into close contact with the inner peripheral surface of the motor housing 11.

A breather chamber 51 for separating lubrication oil that is used within the powertrain 10 is formed within the transmission housing 12. Additionally, the breather chamber 51 is provided with breather piping 39 that communicates with the outside of the breather chamber 51. Thereby, the lubrication oil scattered by the rotation of the power transmission part (gear) or the motor 23 is separated by the breather chamber 51, and is prevented from leaking from the breather piping 39 to the outside.

The breather chamber 51 is formed at a position corresponding to a topmost part of the powertrain 10. Additionally, the breather chamber 51 communicates with the breather passages 35 so that the high-pressure and high-temperature air within the powertrain 10 can be discharged from the breather piping 39. Moreover, the breather chamber 51 communicates with the motor chamber 36, the transmission chamber 37, and the sensor chamber 38 via the breather passages 35.

Here, the configuration of the rotor 15 will be described with reference to FIGS. 2 and 3.

Figure 2:
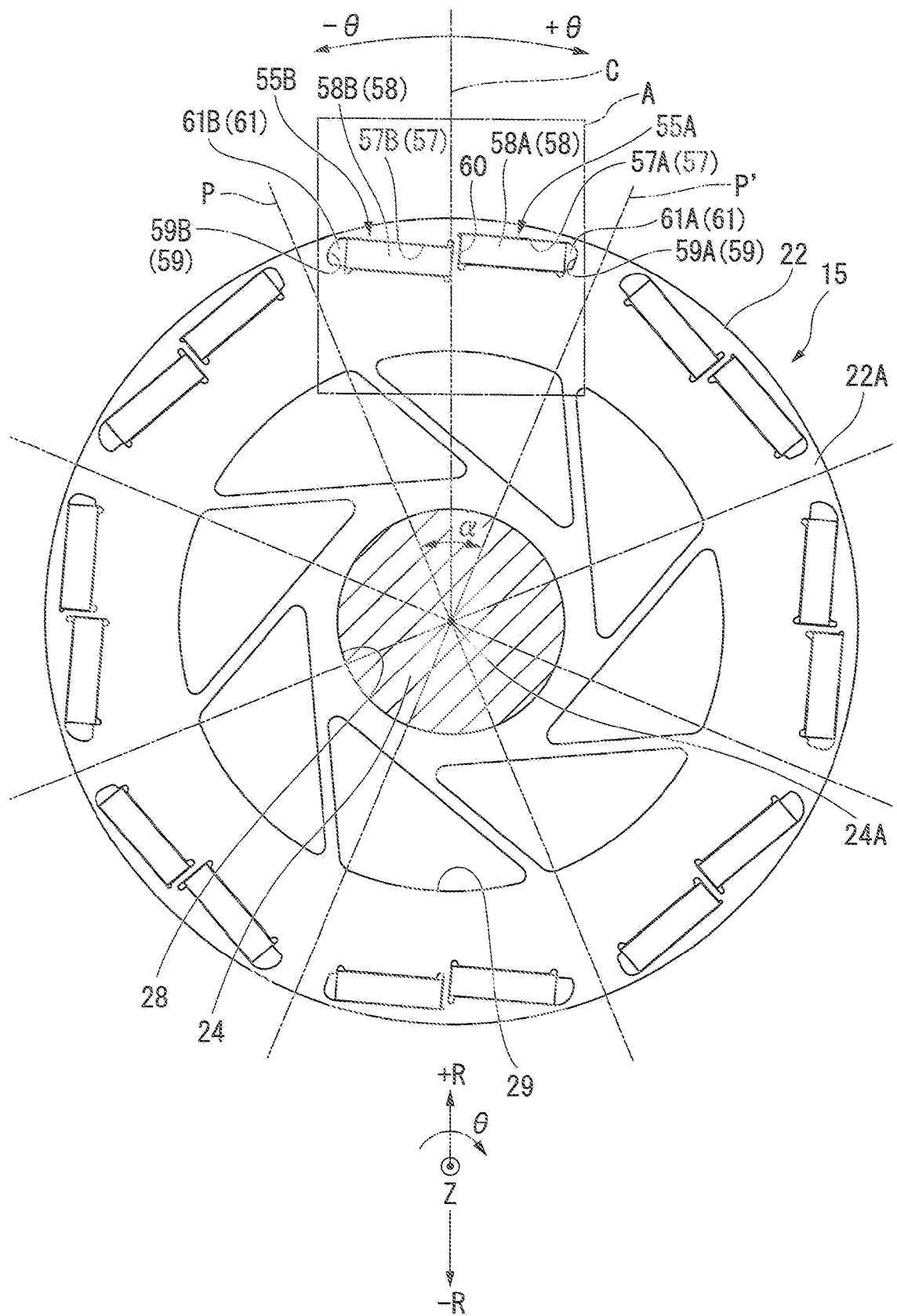
FIG. 2 is a plan view of a rotor in the embodiment.

FIG. 2 is a plan view of the rotor. FIG. 3 is a partial enlarged view (plan view) of the rotor.

As shown in FIG. 2, the rotor 15 includes a rotor core (hereinafter referred to as "a rotor core") 22 in which a plurality of electromagnetic steel sheet formed bodies (hereinafter referred to as "rotor core pieces") 22A is laminated, and permanent magnets 58 (58A, 58B) held within insertion holes 57 (57A, 57B) formed in the rotor core 22, and is rotatably supported by the output shaft 24. The rotor 15 is arranged to face the annular stator 21 (refer to FIG. 1) around which a coil 20 (refer to FIG. 1) is wound, at a predetermined gap therefrom.

When the rotor core 22 is viewed from a visual line including an axial center 24A of the output shaft 24, a forward rotational (+θ) direction and a reverse rotational (−θ) direction are assigned to the clockwise direction along the circumferential direction around the axial center 24A.

(Rotor Core Piece 22A)

As shown in FIG. 2, the rotor core piece 22A of the present embodiment is a member made of a magnetic sheet, such as a substantially disk-shaped electromagnetic steel sheet. The rotor core piece 22A is formed by a press.

A substantially central portion of the rotor core piece 22A is formed with a through hole 28 for allowing the output shaft 24 to be inserted through. The diameter of the through hole 28 is set so as to be slightly smaller than the external diameter of the output shaft 24. This enables the rotor core 22 to be press-fitted into and fixed to the output shaft 24 after the rotor core 22 is formed as will be described below. Additionally, a plurality of lightening portions 29 is formed around the through hole 28. In the present embodiment, for example, eight substantially triangular lightening portions 29 are formed along the circumferential direction. This can lighten the rotor core 22. In addition, the lightening portions 29 may not be formed.

Figure 3:
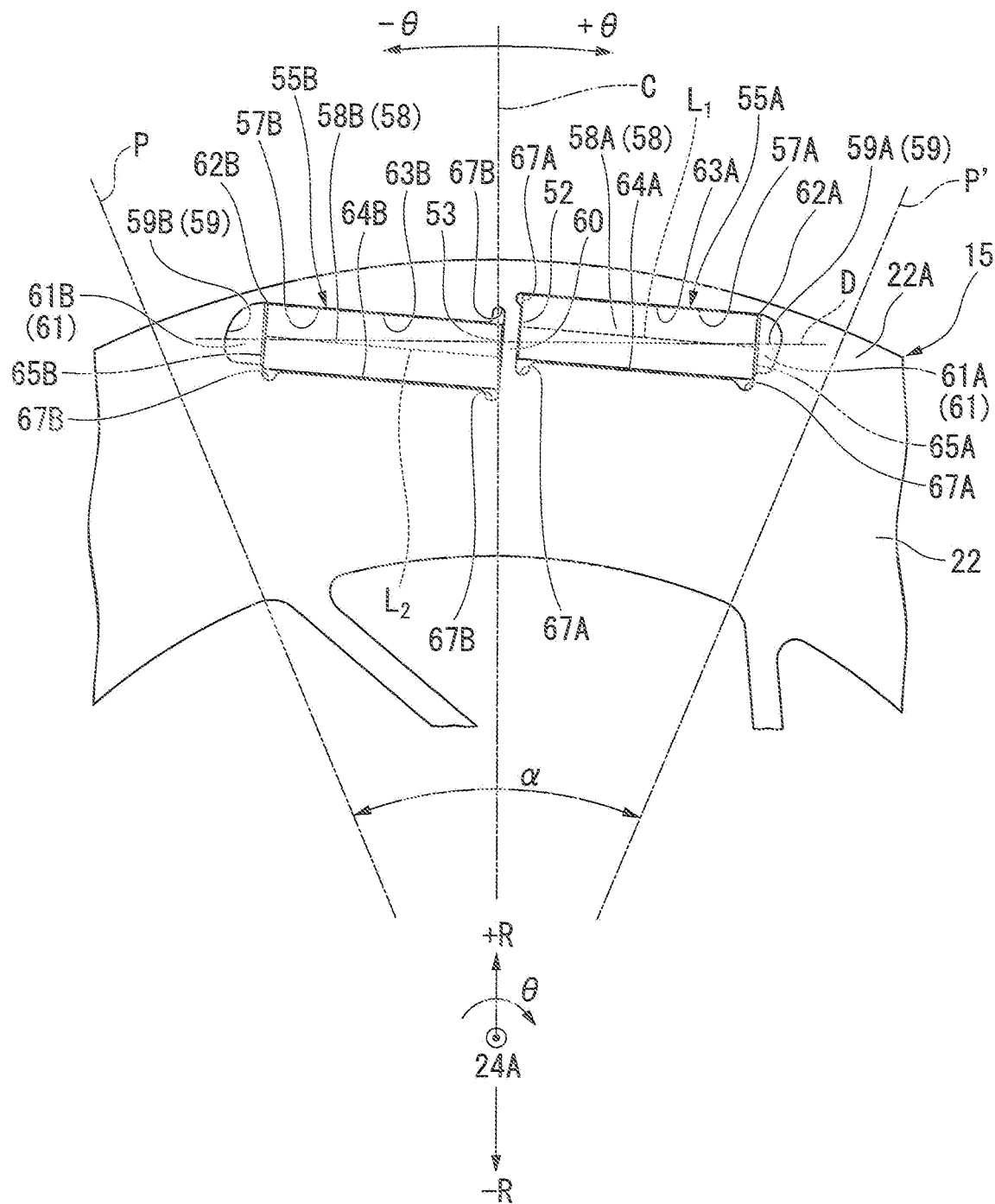
FIG. 3 is a partial enlarged view of the rotor.

Additionally, as shown in FIG. 3, when the rotor core piece 22A is viewed from the visual line, the permanent magnets 58 (58A, 58B) constituting a plurality of poles are arranged at substantially regular intervals at predetermined pole pitch angles along the circumferential direction. Additionally, first hollow portions 55A having the first permanent magnets 58A inserted thereinto, second hollow portions 55B having the second permanent magnets 58B inserted thereinto, and ribs 60 partitioning the first hollow portions 55A and the second hollow portions 55B are formed such that a permanent magnet 58 arranged at one pole is arranged in a segmented manner as the first permanent magnet 58A and the second permanent magnet 58B. The rib 60 is formed between the end portion of the first hollow portion 55A on the −θ side and the end portion of the second hollow portion 55B on the +θ side.

For example, eight sets of the first hollow portions 55A and the second hollow portions 55B of the present embodiment are formed. That is, the rotor 15 of the present embodiment is a rotor 15 of eight poles (four pole pairs) in which the angle α between centerlines P-P' of poles (hereinafter referred to as a "pole pitch angle") becomes 45 degrees. In addition, in the following description, the centerline of the pole pitch angle α is defined as a centerline C.

(First Hollow Portion 55A)

As shown in FIG. 3, the first hollow portion 55A is located more in the +θ direction than the centerline C when viewed from the visual line. The first hollow portion 55A is formed by connecting a first end portion 52 that corresponds to a lateral face of the rib 60 and is shown in a linear fashion in plan view, a first outer lateral face 63A that is provided to extend in a direction substantially perpendicular to the first end portion 52 from a +R-side end portion of the rib 60 toward the +θ direction, a first inner lateral face 64A that is provided to extend in the direction substantially perpendicular to the first end portion 52 from a −R-side end portion of the rib 60 toward the +θ direction, a +θ-side end portion of the first outer lateral face 63A, and a +θ-side end portion of the first inner lateral face 64A in a substantially arcuate shape.

Additionally, the first hollow portion 55A has a first insertion hole 57A into which a first permanent magnet 58A is inserted. Specifically, the first insertion hole 57A is formed in a substantially rectangular shape by a region surrounded by the first end portion 52, the first outer lateral face 63A, the first inner lateral face 64A, and a short side 65A that linearly connects the +θ-side end portion of the first outer lateral face 63A and the +θ-side end portion of the first inner lateral face 64A. In addition, in FIG. 3, the short side 65A is expressed by a virtual line.

Space portions 67A that are, for example arcuate when viewed from the sight line are formed at corner portions of the first insertion hole 57A. Specifically, the space portions 67A are formed in three places including a corner portion between the first end portion 52 and the first outer lateral face 63A, a corner portion between the first end portion 52 and the first inner lateral face 64A, and a corner portion between the short side 65A and the first inner lateral face 64A. As the space portions 67A are formed at the corner portions of the first insertion hole 57A, a corner portion $58A_1$ of the first permanent magnet 58A can be prevented from interfering with the first insertion hole 57A when the first permanent magnet 58A to be described below is inserted into and fixed to the first insertion hole 57A. Additionally, when the rotor core 22 has rotated, the stress of the rotor core 22 can be prevented from being concentrated on the corner portion $58A_1$ of the first permanent magnet 58A due to the centrifugal force of the rotor core 22. Therefore, the first permanent magnet 58A or the rotor core piece 22A can be prevented from being damaged. Moreover, an adhesive spreads uniformly into the gap between the first permanent magnet 58A and the first insertion hole 57A by injecting the adhesive into the space portions 67A. For this reason, the rotor core 22 can be made to reliably hold the first permanent magnet 58A.

Moreover, a first flux barrier 61A for preventing the magnetic flux of the first permanent magnet 58A from leaking is provided on the +θ side of the first hollow portion 55A. Specifically, the first flux barrier 61A is formed by a region surrounded by a first peripheral edge portion 59A that connects the +θ-side end portion of the first outer lateral face 63A and the +θ-side end portion of the first inner lateral face 64A in a substantially arcuate shape, and the short side 65A.

If the first permanent magnet 58A to be described below is inserted into the first insertion hole 57A, an air gap resulting from the first flux barrier 61A is formed on the +θ side of the first permanent magnet 58A. Since the air gap has high magnetic resistance, leakage of the d-axis magnetic flux can be suppressed by forming the first flux barrier 61A, thereby narrowing a short-circuiting magnetic path having low magnetic resistance.

Additionally, the first peripheral edge portion 59A of the first flux barrier 61A is curved, and the curvature radius on the external diameter side (+R side) of the first peripheral edge portion 59A is set so as to become larger than the curvature radius on the internal diameter side (−R side) of the first peripheral edge portion 59A. If the rotor 15 rotates in a state where the first permanent magnet 58A to be described below is inserted into the first insertion hole 57A, the first permanent magnet 58A is pushed against the first outer lateral face 63A of the first hollow portion 55A by a centrifugal force. At this time, although a tensile stress acts on the first peripheral edge portion 59A of the first flux barrier 61A, since the curvature radius of the first peripheral edge portion 59A on the +R side is larger than the curvature radius thereof on the −R side, particularly the stress of the first peripheral edge portion 59A on the +R side on which a centrifugal force tends to act can be widely effectively decentralized. In this way, since the tensile stress caused by the centrifugal force can be prevented from being concentrated on one place, the permanent magnet 58 and the rotor core piece 22A can be prevented from being damaged.

As shown in FIG. 3, the end portion of the first hollow portion 55A of the present embodiment on the +θ direction is formed obliquely from the −θ direction of the rotor core 22 toward the +θ direction side so as to be located on the axial center 24A side when viewed from the visual line. Specifically, a longitudinal axis $L_1$ (hereinafter referred to a first axis $L_1$) of the first hollow portion 55A is arranged so as to obliquely intersect in the +θ direction with respect to the perpendicular line D of the centerline C when viewed from the visual line. The effects obtained by forming the first axis $L_1$ of the first hollow portion 55A so as to incline with respect to the perpendicular line D in this way will be described below in detail.

(Second Hollow Portion 55B)

The second hollow portion 55B will be described below. In addition, description regarding the same constituent portions as those of the first hollow portion 55A will be omitted.

As shown in FIG. 3, the second hollow portion 55B is located closer to the −θ direction than the centerline C when viewed from the visual line. The second hollow portion 55B is formed by connecting a second end portion 53 that corresponds to a lateral face of the rib 60 and is shown in a linear fashion in plan view, a second outer lateral face 63B that is provided to extend in a direction substantially perpendicular to the second end portion 53 from a +R-side end portion of the rib 60 toward the −θ direction, a second inner lateral face 64B that is provided to extend in the direction substantially perpendicular to the second end portion 53 from a −R-side end portion of the rib 60 toward the −θ direction, a −θ-side end portion of the second outer lateral face 63B, and a −θ-side end portion of the second inner lateral face 64B in a substantially arcuate shape.

Additionally, the second hollow portion 55B has a second insertion hole 57B into which a second permanent magnet 58B is inserted. Specifically, the second insertion hole 57B is formed in a substantially rectangular shape by a region surrounded by the second end portion 53, the second outer lateral face 63B, the second inner lateral face 64B, and a short side 65B that linearly connects the −θ-side end portion of the second outer lateral face 63B and the −θ-side end portion of the second inner lateral face 64B. In addition, in FIG. 3, the short side 65B is expressed by a virtual line.

Space portions 67B that are, for example arcuate when viewed from the visual line are formed at corner portions of the second insertion hole 57B. Specifically, the space portions 67B are formed in three places including a corner portion between the second end portion 53 and the second outer lateral face 63B, a corner portion between the second end portion 53 and the second inner lateral face 64B, and a corner portion between the short side 65B and the second inner lateral face 64B. This can prevent a corner portion $58B_1$ of the second permanent magnet 58B from interfering with the second insertion hole 57B when the second permanent magnet 58B is inserted into and fixed to the second insertion hole 57B. Additionally, when the rotor core 22 has rotated, the stress of the rotor core 22 can be prevented from being concentrated on the corner portion $58B_1$ of the second permanent magnet 58B due to the centrifugal force of the rotor core 22. Therefore, the second permanent magnet 58B or the rotor core piece 22A can be prevented from being damaged.

Moreover, a second flux barrier 61B for preventing the magnetic flux of the second permanent magnet 58B from leaking is provided on the −θ side of the second hollow portion 55B. Specifically, the second flux barrier 61B is formed by a region surrounded by a second peripheral edge portion 59B that connects the −θ-side end portion of the second outer lateral face 63B and the −θ-side end portion of the second inner lateral face 64B in a substantially arcuate shape, and the short side 65B.

The end portion of the second hollow portion 55B of the present embodiment in the +θ direction is formed obliquely from the −θ side of the rotor core 22 toward the +θ direction so as to be located at the side of the axial center 24A when viewed from the visual line. Specifically, it is preferable that a longitudinal axis $L_2$ (hereinafter referred to a second axis $L_2$) of the second hollow portion 55B, similar to the first axis $L_1$, be arranged so as to obliquely intersect in the +θ direction with respect to the perpendicular line D of the centerline C when viewed from the visual line. Additionally, it is especially preferable that the second axis $L_2$ be substantially parallel to the first axis $L_1$. The effects when the second axis $L_2$ of the second hollow portion 55B is obliquely formed in this way will also be described below in detail.

In the above-described first insertion hole 57A and second insertion hole 57B, an outer peripheral side corner portion 62A of the first permanent magnet 58A on the +θ direction and an outer peripheral side corner portion 62B of the second permanent magnet 58B on the −θ direction are formed so as to be disposed on the same circumference around the axial center 24A when viewed from the visual line. Thereby, the outer peripheral side corner portion 62A of the first permanent magnet 58A on the +θ direction and the outer peripheral side corner portion 62B of the second permanent magnet 58B on the −θ direction are located on the outermost peripheral side of the rotor core piece 22A when viewed from the visual line. Thereby, if the rotor core 22 formed by the rotor core piece 22A rotates to the +θ-direction, the short-circuiting magnetic paths of the d-axis magnetic flux on the +θ side of the first insertion hole 57A and on the −θ side of the second insertion hole 57B can be narrowed. Additionally, since the d-axis magnetic flux that leaks from the first permanent magnet 58A and the second permanent magnet 58B can be minimized, a magnetic force can be efficiently converted into a rotative force.

Incidentally, as described above, the first axis $L_1$ of the first hollow portion 55A and the second axis $L_2$ of the second hollow portion 55B are formed obliquely with respect to the perpendicular line D in the +θ direction while the outer peripheral side corner portion 62A of the first permanent magnet 58A on the +θ direction and the outer peripheral side corner portion 62B of the second permanent magnet 58B on the −θ direction are disposed on the same circumference, For this reason, as shown in FIG. 3, the area of the rotor core piece 22A closer to the −θ side than the centerline C and closer to the +R direction than the second hollow portion 55B becomes larger than the area of the rotor core piece 22A closer to the +θ side than the centerline C and closer to the +R direction than the first hollow portion 55A. Hence, when the second flux barrier 61B has the same area as the first flux barrier 61A, the center of gravity is biased to the −θ-direction where the second hollow portion 55B is formed, in a region closer to the +θ side and a region closer to the −θ side than from the centerline C of the rotor core piece 22A. For this reason, the dynamic balance of the rotor core piece 22A when the rotor 15 rotates is collapsed.

On the other hand, as the second flux barrier 61B is formed so as to have a larger area than the first flux barrier 61A, an effective area obtained by subtracting the area of the second flux barrier 61B from the area of a region closer to the +R direction rather than the second hollow portion 55B in the rotor core piece 22A, and an effective area obtained by subtracting the area of the first flux barrier 61A from the area of a region closer to the +R direction than the first hollow portion 55A in the rotor core piece 22A substantially coincide with each other. Accordingly, weight can be balanced between the region on the +θ side and the region on the −θ side across the centerline C. For this reason, the dynamic balance when the rotor core piece 22A rotates can be secured, and the rotor core 22 and the rotor 15 with little torque pulsation can be formed.

(Rotor Core 22)

The rotor core 22 is formed by laminating a plurality of disk-shaped rotor core pieces 22A each having the above-described first hollow portions 55A and second hollow portions 55B. Specifically, dowels (not shown) are formed in the rotor core pieces 22A by caulking the rotor core pieces 22A overlappingly. The rotor core pieces 22A can be coupled, laminated, and fixed by the dowels. Positional deviation of the rotor core pieces 22A can be prevented by forming the dowels to perform caulking in a plurality of locations. In addition, the rotor core pieces 22A may be laminated by bonding.

Here, the surface of the rotor core piece 22A is subjected to insulation treatment with an insulating coating of an inorganic material or the like. As the surface of the rotor core piece 22A is coated with an insulating coating of an inorganic material or the like, an electrical insulation state between adjacent rotor core pieces 22A can be secured when a plurality of rotor core pieces 22A is laminated. Thereby, since a passage for an eddy current can be narrowed, a magnetic force can be efficiently converted into a rotative force. In addition, it is preferable that the rotor core piece 22A be formed as thinly as possible. Since the passage for an eddy current can be narrowed by making the rotor core piece 22A thin, the rotor core 22 with higher efficiency can be provided.

(Permanent Magnet 58)

The first permanent magnet 58A is formed in a substantially rectangular shape viewed from the Z direction. Specifically, the first permanent magnet is formed in a substantially rectangular shape by substantially linear lateral faces corresponding to the first end portion 52, the first outer lateral face 63A, the first inner lateral face 64A, and the short side 65A of the first hollow portion 55A.

The second permanent magnet 58B, similar to the first permanent magnet 58A, is formed in a substantially rectangular shape viewed from the Z direction. Specifically, the second permanent magnet is formed in a substantially rectangular shape by substantially linear lateral faces corresponding to the second end portion 53, the second outer lateral face 63B, the second inner lateral face 64B, and the short side 65B of the second hollow portion 55B. In addition, in the present embodiment, the same permanent magnets 58 are used for the first permanent magnet 58A and the second permanent magnet 58B. This can achieve cost reduction resulting from sharing of parts.

(Rotor 15)

The rotor 15 is formed by fixing the output shaft 24 to the through hole 28 of the above-described rotor core 22, fixing the first permanent magnets 58A to the first insertion holes 57A, and fixing the second permanent magnets 58B to the second insertion holes 57B.

Returning to FIG. 1, the output shaft 24 is arranged substantially at the center of the motor housing 11, and the rotor core 22 is attached to the outer peripheral surface of the output shaft 24. The rotor core 22 includes the through hole 28 for allowing the output shaft 24 to be inserted therethrough as mentioned above, and is fixed to the output shaft 24, for example, by press-fitting. In addition, a key seat (not shown) dented to the −R direction may be formed along the Z direction in the outer peripheral surface of the output shaft 24, a portion of the through hole 28 of the rotor core 22 may be formed with a projection portion (not shown) that protrudes to the −R direction, and the output shaft 24 may be press-fitted into the rotor core 22 while the key seat and the protruding portion are fitted to each other. This can prevent the rotor core 22 and the output shaft 24 from deviating in the θ direction, and can reliably transmit the rotation resulting from a magnetic force to the output shaft 24.

As shown in FIGS. 2 and 3, the first permanent magnets 58A are inserted into the first insertion holes 57A, and the second permanent magnets 58B are inserted into and fixed to the second insertion holes 57B. After the first permanent magnets 58A are inserted into the first insertion holes 57A as mentioned above, an adhesive is injected into the space portions 67A and 67B formed at the corner portions of the insertion holes 57A and 57B, so that the rotor core 22 can be made to reliably hold the permanent magnets 58A and 58B. In addition, the rotor core 22 may be made to hold the permanent magnets 58A and 58B using a resin mold.

Here, as mentioned above, the first axis $L_1$ of the first hollow portion 55A is arranged so as to obliquely intersect in the clockwise direction with respect to the perpendicular line D of the centerline C when viewed from the visual line. Thereby, the d-axis magnetic flux generated from the first permanent magnet 58A inserted into the first hollow portion 55A distributes in a biased distribution to the +θ direction with respect to the centerline C.

Figure 4:
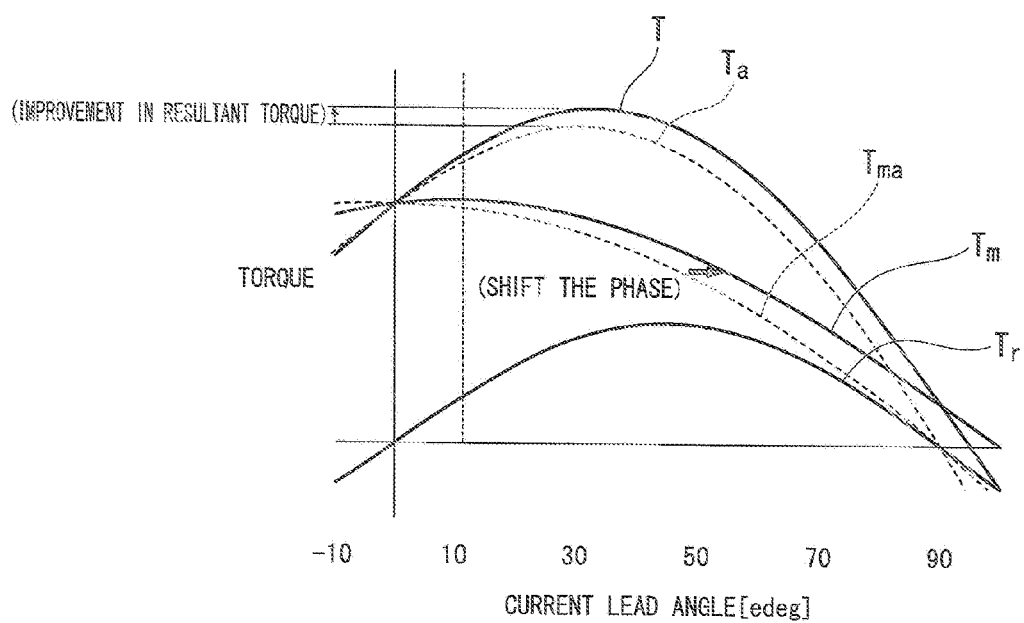
FIG. 4 is a torque phase diagram.

FIG. 4 is a torque phase diagram.

As described above, if the first permanent magnet 58A is inserted into the first hollow portion 55A, the longitudinal axis (first axis $L_1$) of the first permanent magnet 58A is arranged so as to obliquely intersect in the +θ direction with respect to the perpendicular line D of the centerline C. For this reason, the d-axis magnetic flux produced by the first permanent magnet 58A distributes in a biased distribution to the +θ direction from the centerline C. For this reason, as shown in FIG. 4, as compared to the phase at the peak of a magnet torque Tma in a case where the d-axis magnetic flux is distributed along the centerline C, the phase at the peak of the magnet torque Tm in the present embodiment approaches the phase at the peak of a reluctance torque Tr. Accordingly, a resultant torque T of the magnet torque Tm and the reluctance torque Tr, that is, the torque of the motor can be further improved compared with a resultant torque Ta in a case where the d-axis magnetic flux is distributed along the centerline C between poles. This enables a large resultant torque to be obtained at starting or during abrupt load fluctuation. From the above, an efficient motor and a vehicle using the same can be provided.

Additionally, as the second axis $L_2$ of the second hollow portion 55B, similar to the first axis $L_1$, is arranged so as to obliquely intersect in the $+\theta$ direction with respect to the perpendicular line D of the centerline C when viewed from the visual line, the d-axis magnetic flux produced from the second permanent magnet 58B inserted into the second hollow portion 55B distributes in a biased distribution to the $+\theta$ direction with respect to the centerline C. For this reason, as compared to the rotor core piece 22A in which only the first axis $L_1$ is formed obliquely with respect to the perpendicular line D, more d-axis magnetic flux distributes in a biased distribution to the $+\theta$ direction from the centerline C. Thereby, the phase at the peak of the magnet torque Tm produced from the second permanent magnet 58B approaches the phase at the peak of the reluctance torque Tr. Hence, compared to the rotor core piece 22A in which only the first axis $L_1$ inclines, the resultant torque T of the reluctance torque Tr and the magnet torque Tm can be improved.

Additionally, as the second axis $L_2$ of the second hollow portion 55B and the first axis $L_1$ of the first hollow portion 55A are made substantially parallel, as compared to a case where the second axis $L_2$ and the first axis $L_1$ are not substantially parallel, more d-axis magnetic flux can be distributed in a biased distribution in the $+\theta$ direction with respect to the centerline C. Accordingly, the reluctance torque Tr can be more effectively used by rotating the rotor core 22 formed by such rotor core pieces 22A into the $+\theta$ direction. For this reason, the resultant torque T of the reluctance torque Tr and the magnet torque Tm can be further improved. This enables a large resultant torque to be obtained at the start-up of the rotor core 22 or during abrupt load fluctuation thereof. From the above, an efficient motor and a vehicle using the same can be provided.

In addition, this invention is not limited only to the above-described embodiment.

In the present embodiment, the second axis $L_2$ of the second hollow portion 55B is arranged so as to obliquely intersect in the $+\theta$ direction with respect to the perpendicular line D of the centerline C. However, the second axis $L_2$ does not necessarily incline in the $+\theta$ direction with respect to the perpendicular line D, and at least the first axis $L_1$ may be arranged so as to obliquely intersect in the $+\theta$ direction with respect to the perpendicular line D. Specifically, for example, the second axis $L_2$ may be arranged along a direction orthogonal to the centerline C.

Additionally, in the present embodiment, the second axis $L_2$ is formed so as to be substantially parallel to the first axis $L_1$. However, the second axis $L_2$ is not necessarily formed so as to be substantially parallel to the first axis $L_1$. The inclination degree of the second axis $L_2$ can be appropriately selected according to the characteristics of the magnet torque of the permanent magnets 58 (58A, 58B) or the characteristics of the reluctance torque.

Although the rotor of the present embodiment is formed by eight poles (four pole pairs), the number of poles of the rotor is not limited to eight poles, and the number of poles of the rotor can be appropriately selected according to characteristics required for the motor.

The rotating electrical machine of the present embodiment is used for driving. However, the application of the rotating electrical machine is not limited to the driving, and can also be used for power generation. In addition, when the rotating electrical machine is used for power generation it is desirable that the first axis $L_1$ and the second axis $L_2$ be arranged so as to obliquely intersect in the $-\theta$ direction with respect to the perpendicular line D of the centerline C when viewed from the visual line.

REFERENCE SIGNS LIST

3: ONE-DIMENSIONAL IMAGE SENSOR
4: WIDE LENS
5: ILLUMINATION LAMP
15: ROTOR
21: STATOR
22: ROTOR CORE
22A: ROTOR CORE PIECE (ELECTROMAGNETIC STEEL, SHEET FORMED BODY)
23: MOTOR (ROTATING ELECTRICAL MACHINE)
24: OUTPUT SHAFT
24A: AXIAL CENTER
52: FIRST END PORTION (END PORTION)
53: SECOND END PORTION (END PORTION)
55A: FIRST HOLLOW PORTION
55B: SECOND HOLLOW PORTION
57: INSERTION HOLE
57A FIRST INSERTION HOLE
57B: SECOND INSERTION HOLE
58: PERMANENT MAGNET
58A: FIRST PERMANENT MAGNET
$58A_1$: CORNER PORTION
58B: SECOND PERMANENT MAGNET
$58B_1$: CORNER PORTION
59: PERIPHERAL EDGE PORTION
59A: FIRST PERIPHERAL EDGE PORTION
59B: SECOND PERIPHERAL EDGE PORTION
60: RIB
61: FLUX BARRIER
61A: FIRST FLUX BARRIER
61B: SECOND FLUX BARRIER
62A, 62B: CORNER PORTION
63A: LATERAL FACE (FIRST OUTER LATERAL FACE)
64A: LATERAL FACE (FIRST INNER LATERAL FACE)
63B: LATERAL FACE (SECOND OUTER LATERAL FACE)
64B: LATERAL FACE (SECOND INNER LATERAL FACE)
67A, 67B: SPACE PORTION
$+\theta$: FORWARD ROTATIONAL DIRECTION
$-\theta$: REVERSE ROTATIONAL DIRECTION
C: CENTERLINE
$\alpha$: PITCH ANGLE
$L_1$: FIRST AXIS (LONGITUDINAL AXIS OF FIRST HOLLOW PORTION)
$L_2$: SECOND AXIS (LONGITUDINAL AXIS OF SECOND HOLLOW PORTION)
D: PERPENDICULAR LINE

The invention claimed is:

1. An electromagnetic steel sheet formed body to be used in a rotor core in which a forward rotational direction and a reverse rotational direction are assigned to a clockwise direction along a circumferential direction around an axial center when viewed from a visual line including the axial center, wherein a first hollow portion having a first permanent magnet inserted thereinto, a second hollow portion having a second permanent magnet inserted thereinto, and a rib partitioning the first hollow portion and the second hollow portion is formed at the electromagnetic steel sheet formed body such that permanent magnets constituting a plurality of poles are arranged substantially at regular intervals at predetermined pole pitch angles along the circumferential direction, and that the permanent magnet disposed at one pole is arranged in a segmented manner as the first permanent magnet and the second permanent magnet, when viewed from the visual line, and wherein the first hollow portion when viewed from the visual line is located closer to a side of the forward rotational direction than a centerline passing through a center angle of the pole pitch angle, and is arranged such that a longitudinal axis of the first hollow portion obliquely intersects in the clockwise direction with respect to a line perpendicular to the centerline.

2. The electromagnetic steel sheet formed body according to claim 1, wherein the second hollow portion when viewed from the visual line is located closer to a side of the reverse rotational direction than the centerline, and is arranged such that a longitudinal axis of the second hollow portion obliquely intersects in the clockwise direction with respect to the line perpendicular to the centerline.

3. The electromagnetic steel sheet formed body according to claim 2, wherein the longitudinal axis of the first hollow portion and the longitudinal axis of the second hollow portion are substantially parallel when viewed from the visual line.

4. The electromagnetic steel sheet formed body according to claim 2, wherein the first insertion hole and the second insertion hole are formed such that an outer peripheral side corner portion of the first permanent magnet on the side of the forward rotational direction and an outer peripheral side corner portion of the second permanent magnet on the side of the reverse rotational direction are arranged on a same circumference around the axial center, when viewed from the visual line.

5. The electromagnetic steel sheet formed body according to claim 2, further comprising;

a first flux barrier provided at the side of the forward rotational direction of the first hollow portion to prevent leakage of a magnetic flux of the first permanent magnet; and a second flux barrier provided at the side of the reverse rotational direction of the second hollow portion to prevent leakage of a magnetic flux of the second permanent magnet.

6. The electromagnetic steel sheet formed body according to claim 5, wherein the second flux barrier has a larger area than the first flux barrier.

7. The electromagnetic steel sheet formed body according to claim 5, wherein a peripheral edge portion of the first flux barrier and a peripheral edge portion of the second flux barrier are curved, and a curvature radius of the each peripheral edge portions on a side of an external diameter are larger than a curvature radius of the each peripheral edge portions on a side of an internal diameter.

8. The electromagnetic steel sheet formed body according to claim 1, further comprising;

a substantially rectangular first insertion hole provided at the first hollow portion and having the first permanent magnet inserted thereinto; and a substantially rectangular second insertion hole provided at the second hollow portion and having the second permanent magnet inserted thereinto, wherein space portion is formed at a corner portion of the first insertion hole and at a corner portion of the second insertion hole, when viewed from the visual line.

9. A rotor core formed by laminating a plurality of the electromagnetic steel sheet formed bodies according to claim 1, wherein each of the electromagnetic steel sheet formed bodies have been subjected to an insulation treatment.

10. A rotor comprising:

the rotor core according to claim 9; and the first permanent magnet inserted into the first hollow portion of the rotor core and the second permanent magnet inserted into the second hollow portion.

11. A rotating electrical machine comprising:

the rotor according to claim 10; and a substantially annular stator arranged so as to cover an outer peripheral surface of the rotor.

12. A vehicle using the rotating electrical machine according to claim 11 as a rotating electrical machine for driving.

* * * * *